United States Patent
Sun et al.

(10) Patent No.: US 11,419,029 B2
(45) Date of Patent: Aug. 16, 2022

(54) SWITCHING METHOD, NETWORK ELEMENT, GATEWAY, BASE STATION, FRAMEWORK, APPARATUS, AND STORAGE MEDIUM

(71) Applicants: CHINA MOBILE COMMUNICATION LTD., RESEARCH INSTITUTE, Beijing (CN); CHINA MOBILE COMMUNICATIONS CORPORATION, Beijing (CN)

(72) Inventors: Tao Sun, Beijing (CN); Dan Wang, Beijing (CN); Lu Lu, Beijing (CN)

(73) Assignees: CHINA MOBILE COMMUNICATION LTD, RESEARCH INSTITUTE, Beijing (CN); CHINA MOBILE COMMUNICATIONS CORPORATION, Beijing (CN)

( * ) Notice: Subject to any disclaimer, the term of this patent is extended or adjusted under 35 U.S.C. 154(b) by 799 days.

(21) Appl. No.: 16/098,463

(22) PCT Filed: Apr. 21, 2017

(86) PCT No.: PCT/CN2017/081464
§ 371 (c)(1),
(2) Date: Nov. 2, 2018

(87) PCT Pub. No.: WO2017/193797
PCT Pub. Date: Nov. 16, 2017

(65) Prior Publication Data
US 2021/0243662 A1    Aug. 5, 2021

(30) Foreign Application Priority Data
May 9, 2016 (CN) .......................... 201610302861.4

(51) Int. Cl.
*H04W 36/12* (2009.01)
*H04W 76/12* (2018.01)
(Continued)

(52) U.S. Cl.
CPC ......... *H04W 36/12* (2013.01); *H04L 61/2007* (2013.01); *H04W 8/14* (2013.01);
(Continued)

(58) Field of Classification Search
None
See application file for complete search history.

(56) References Cited

U.S. PATENT DOCUMENTS 6,957,008 B1    10/2005 Yasui
2015/0181470 A1*  6/2015 Chai ............... H04W 36/08
                                                    455/438
(Continued)

FOREIGN PATENT DOCUMENTS

CN    101610554 A    12/2009
CN    102256236 A    11/2011
(Continued)

OTHER PUBLICATIONS

"3rd Generation Partnership Project;Technical Specification Group Services and System Aspects; Study on control and user plane separation of EPC nodes" 3GPP TR 23.714 V0.4.0, Release 14, Technical Report, Apr. 2016, 72 Pages.
(Continued)

*Primary Examiner* — Peter Chen
*Assistant Examiner* — Jeff Banthrongsack
(74) *Attorney, Agent, or Firm* — BakerHostetler

(57) ABSTRACT

A gateway-switching method includes: a control plane network element receives a switch request message; when determining, according to the switch request message, whether gateway switching is desired by user equipment
(Continued)

(UE), the control plane network element allocates to the UE a UE Internet Protocol (IP) address corresponding to a target distributed gateway; the control plane network element sends to the target distributed gateway the UE IP address; and the control plane network element sends to a target base station the UE IP address, wherein the UE IP address is used by the target base station for sending data to the UE. Also provided in the embodiments of the present invention are a communication apparatus and non-transitory computer storage medium.

15 Claims, 8 Drawing Sheets

(51) Int. Cl.
H04W 8/14 (2009.01)
H04W 88/16 (2009.01)
H04W 48/00 (2009.01)
H04W 76/11 (2018.01)
H04L 61/5007 (2022.01)

(52) U.S. Cl.
CPC ............ *H04W 48/17* (2013.01); *H04W 76/11* (2018.02); *H04W 76/12* (2018.02); *H04W 88/16* (2013.01)

(56) References Cited

U.S. PATENT DOCUMENTS

| | | |
|---|---|---|
| 2015/0271710 A1 | 9/2015 | Zhang et al. |
| 2016/0295476 A1 | 10/2016 | Bi et al. |
| 2016/0374095 A1 | 12/2016 | Jeon et al. |

FOREIGN PATENT DOCUMENTS

| | | | |
|---|---|---|---|
| CN | 102281587 A | 12/2011 | |
| CN | 102833723 A | 12/2012 | |
| CN | 102869000 A | 1/2013 | |
| CN | 104684044 A | 6/2015 | |
| EP | 3073789 A1 | 9/2016 | |
| EP | 3076706 A1 * | 10/2016 | ............ H04W 76/12 |
| EP | 3076706 A1 | 10/2016 | |
| WO | 2014008427 A1 | 1/2014 | |
| WO | 2014049668 A1 | 4/2014 | |
| WO | 2014178602 A1 | 11/2014 | |
| WO | 2014183696 A1 | 11/2014 | |
| WO | 2014183715 A1 | 11/2014 | |
| WO | 2014209007 A1 | 12/2014 | |
| WO | 2015065701 A1 | 5/2015 | |

OTHER PUBLICATIONS

Partial Supplementary Search Report issued in European Application No. 17795415.3, dated Feb. 18, 2019.
"Solution for Enabling (re)selection of efficient user plane paths" China Mobile, Agenda Item: 6.10, Work Item/Release: R-14, SA WG2 Temporary Document, SA WG2 Meeting #113AH, S2-160956, Feb. 23-26, 2016, 4 Pages.
"Solution to Session Management" China Mobile, LG Electronics, Agenda Item: 6.10, Work Item/Release: R-14, SA WG2 Temporary Document, SA WG2 Meeting #113AH, S2-161299, Feb. 23-26, 2016, 4 Pages.
International Search Report in international application No. PCT/CN2017/081464, dated Jul. 12, 2017.
English Translation of the Written Opinion of the International Search Authority in international application No. PCT/CN2017/081464, dated Jul. 12, 2017.

* cited by examiner

SWITCHING METHOD, NETWORK ELEMENT, GATEWAY, BASE STATION, FRAMEWORK, APPARATUS, AND STORAGE MEDIUM

CROSS-REFERENCE TO RELATED APPLICATIONS

The present application is a National Stage of International Patent Application No. PCT/CN2017/081464, filed on Apr. 21, 2017, and claims benefit of Chinese Patent Application No. 201610302861.4, filed on May 9, 2016, the contents of which are hereby incorporated by reference in their entirety.

TECHNICAL FIELD

The disclosure relates to the wireless communications field, and in particular, to a gateway switching method, a control plane network element, a base station, a network architecture, a communications device, and a computer storage medium.

BACKGROUND

FIG. 1 shows a network architecture of an existing Evolved Packet Core (EPC). In FIG. 1, the following network elements are shown: a Mobility Management Entity (MME), a Serving Gateway (SGW), an evolved NodeB (Evolved Node Basestation, eNodeB), a Packet Data Network Gateway (PGW), and a Policy and Charging Rules Function (PCRF). The eNB is connected to the MME through an S1-MME interface, the eNB is connected to the SGW through an s1-U interface, and the SGW is connected to the PGW through an S5/S8 interface. The PGW is connected to the PCRF through a Gx interface. The PGW is connected to the Internet through an SGi interface.

In the structure shown in FIG. 1, when reselecting a PGW, User Equipment (UE) first needs to establish a new Public Data Network (PDN) connection, and an old PDN connection needs to be released after the new PDN connection is established.

In an application process, it is found that PDN connection establishment and release involves many network elements and a large quantity of signaling exchanged between the network elements, thereby leading to a problem of large delays in connection establishment and release.

SUMMARY

In view of the above, a gateway switching method, a control plane network element, a base station, a network architecture, a communications device, and a storage medium expected to be provided in embodiments of the disclosure provide a new network architecture, so as to simply signaling exchange in a gateway switch process, and reduce a delay.

Technical solutions according to embodiments of the disclosure are provided as follows.

Embodiments of the disclosure provide a gateway switching method, including: a control plane network element receives a switch request message; when determining based on the switch request message that User Equipment (UE) needs to perform gateway switching, the control plane network element assigns, to the UE, a UE Internet Protocol (IP) address corresponding to a target distributed gateway; the control plane network element sends the UE IP address to the target distributed gateway; and the control plane network element sends, the UE IP address to a target base station, herein the UE IP address is further sent to the UE by the target base station.

Embodiments of the disclosure further provide a gateway switching method, including: a distributed gateway receives a User Equipment (UE) Internet Protocol (IP) address of UE, which is assigned by a control plane network element based on a switch request; the distributed gateway establishes an uplink tunnel; and the distributed gateway stores a correspondence between an uplink tunnel identifier and the UE IP address, herein the uplink tunnel identifier is a communication identifier of the uplink tunnel.

Embodiments of the disclosure provide a gateway switching method, including: a base station receives downlink tunnel information sent from a control plane network element, herein the downlink tunnel information includes at least a UE Internet Protocol IP address of user equipment UE, an uplink tunnel identifier, and a user plane IP address of a target distributed gateway that are assigned by the control plane network element; the base station establishes a downlink tunnel; the base station sends the UE IP address to the UE, and establishes a wireless connection with the UE; and the base station establishes a correspondence between a downlink tunnel identifier, the uplink tunnel identifier, and the user plane IP address, herein the downlink tunnel identifier is a communication identifier of the downlink tunnel.

Embodiments of the disclosure further provide a control plane network element, including: a first receiving unit arranged to receive a switch request message; a first assignment unit arranged to, when it is determined based on the switch request message that UE needs to perform gateway switching, assign, to the UE, a UE Internet Protocol IP address corresponding to a target distributed gateway; and a first sending unit arranged to send the UE IP address to the target distributed gateway, herein the first sending unit is further arranged to send the UE IP address to a target base station, where the UE IP address is further sent to the UE by the target base station.

Embodiments of the disclosure further provide a distributed gateway, including: a second receiving unit arranged to receive a User Equipment (UE) Internet Protocol (IP) address, which is assigned by a control plane network element based on a switch request; a first establishment unit arranged to establish an uplink tunnel; and a storage unit arranged to store a correspondence between an uplink tunnel identifier and the UE IP address, where the uplink tunnel identifier is a communication identifier of the uplink tunnel.

Embodiments of the disclosure further provide a base station, including: a third receiving unit arranged to receive downlink tunnel information sent from a control plane network element, where the downlink tunnel information includes at least a User Equipment (UE) Internet Protocol (IP) address of UE, an uplink tunnel identifier, and a user plane IP address of a target distributed gateway that are assigned by the control plane network element; a second establishment unit arranged to establish a downlink tunnel; and a third establishment unit arranged to send the UE IP address to the UE, and establish a wireless connection with the UE; and a fourth establishment unit arranged to establish a correspondence between a downlink tunnel identifier, the uplink tunnel identifier, and the user plane IP address, where the downlink tunnel identifier is a communication identifier of the downlink tunnel.

Embodiments of the disclosure provide a network architecture, including: a base station arranged to establish a wireless connection with user equipment UE; a distributed gateway, capable of establishing a connection with the base station; and a control plane network element, for establishing a connection with both the base station and the distributed gateway, and arranged to control connection establishment and information exchange between the base station and the distributed gateway.

Embodiments of the disclosure provide a communications device, including: a communications interface arranged to perform information exchange with another electronic device; a memory arranged to store a computer program; and a processor, connected to both the communications interface and the memory, and arranged to execute the computer program, so as to implement any one of the above-described gateway switching methods.

Embodiments of the disclosure provide a computer storage medium having stored thereon a computer program that, when executed by a processor, causes the processor to perform any one of the above-described gateway switching methods.

According to the gateway switching method, the control plane network element, the base station, the network architecture, the communications device and the computer storage medium based on embodiments of the disclosure, during gateway switching, a control plane network element assigns an IP address of UE, that is, the UE IP address. In this way, it is possible to reduce information exchange required when a distributed gateway further needs to notify the control plane network element of the UE IP address due to assignment of the UE IP address by the distributed gateway itself, thereby reducing signaling exchange and time delay.

DETAILED DESCRIPTION

The following further describes in detail the technical solutions of the disclosure with reference to accompanying drawings and specific embodiments. It should be understood that preferred embodiments described below are only used to describe and illustrate the disclosure and are not intended to limit the disclosure.

Embodiment 1

Figure 1:
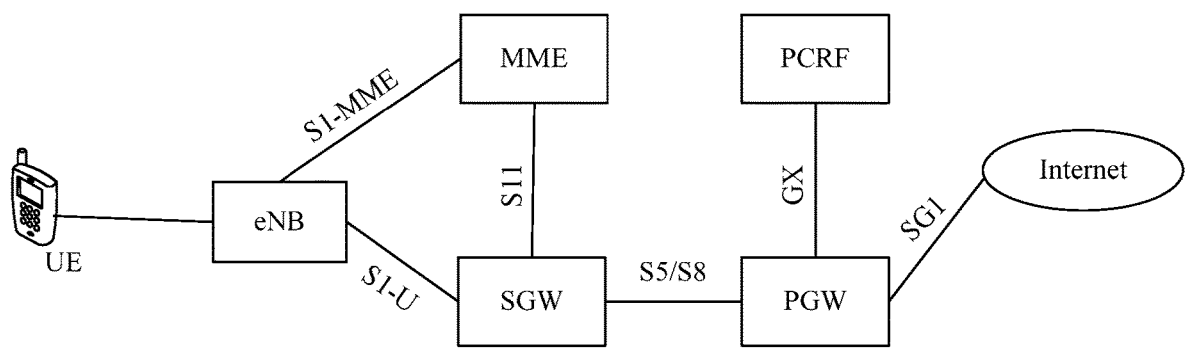
FIG. 1 is a schematic structural diagram of a network architecture.
Figure 2:
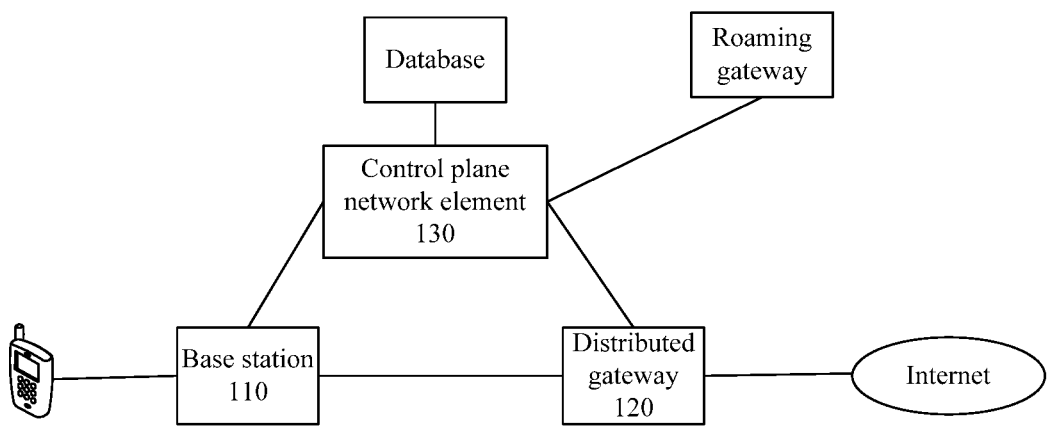
FIG. 2 is a schematic structural diagram of a network architecture according to an embodiment of the disclosure.

As shown in FIG. 2, this embodiment provides a network architecture, including:

a base station 110 arranged to establish a wireless connection with user equipment UE;

a distributed gateway 120, capable of establishing a connection with the base station; and a control plane network element 130, for establishing a connection with both the base station and the distributed gateway, and arranged to control connection establishment and information exchange between the base station and the distributed gateway.

According to the network architecture provided in this embodiment, the control plane network element 130 in this implementation is arranged to perform information management and exchange of communication control. The distributed gateway 120 establishes a data connection with the base station 110, so that UE can be connected to a network to perform service data communication.

The distributed gateway 120 in this embodiment is a network element at a distance, within a specified range, from the base station. Usually, the distributed gateway 120 is relatively near the base station. The control plane network element 130 can be used as an intermediate node for establishing a tunnel or another connection between the base station 110 and the distributed gateway 120, and can perform signaling control between the base station 110 and the distributed gateway 120.

Optionally, the distributed gateway 120 is further arranged to establish a communication tunnel with the UE by using the base station. The communication tunnel can be used by the UE to establish, by using the base station as an intermediate node and as a unique intermediate node, a communication connection with the distributed gateway 120 for data transmission, so as to reduce a quantity of intermediate nodes required for communication, thereby implementing more effective data transmission.

The network architecture further includes:

a roaming gateway arranged to be a gateway for connecting the UE in a non-registration region to the distributed gateway in a registration region.

The roaming gateway in this embodiment and the distributed gateway are a same type of gateway, but the roaming gateway can be arranged to connect the UE in the non-registration region to the distributed gateway in the registration region.

In a specific implementation process, the network architecture further includes a database, and the database stores various information of the UE, for example, subscription information of the UE.

In conclusion, according to the network architecture provided in this embodiment, the network architecture is different from an existing network architecture, is simpler in structure, implements separation of data and a control plane, and can simplify data transmission and connection establishment.

Embodiment 2

Figure 3:
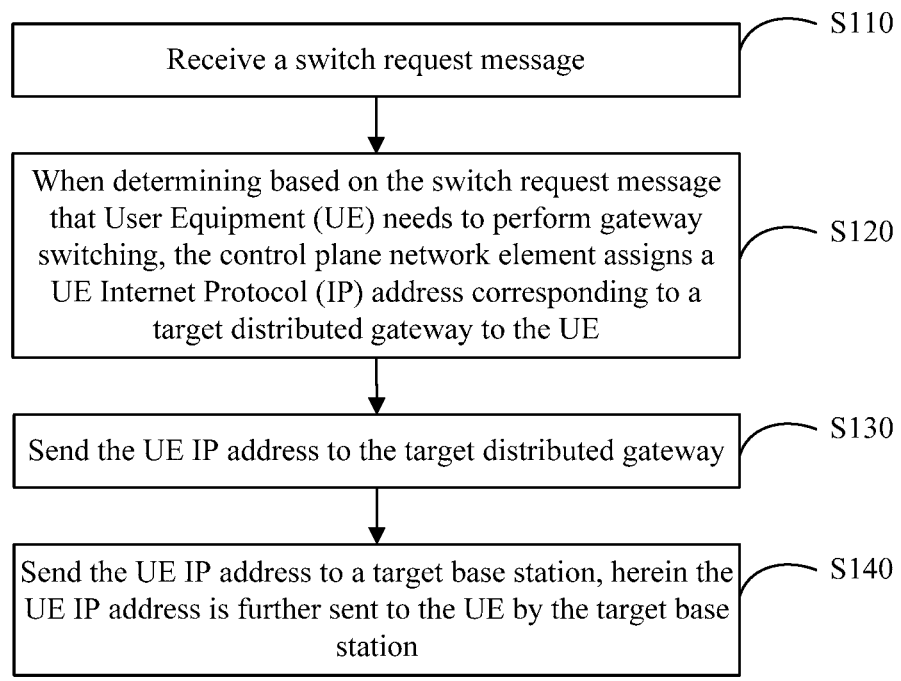
FIG. 3 is a schematic flowchart of a first gateway switching method according to an embodiment of the disclosure.

As shown in FIG. 3, this embodiment provides a gateway switching method in which an execution body is a control plane network element, including the following operations.

At S110, a switch request message is received.

At S120, When determining based on the switch request message that user equipment UE needs to perform gateway switching, the control plane network element assigns, to the UE, a UE Internet Protocol IP address corresponding to a target distributed gateway.

At S130, the UE IP address is sent to the target distributed gateway, herein in a specific implementation process, the UE IP address may be used to establish a correspondence between the target distributed gateway and an uplink tunnel; in this case, during data transmission, a tunnel identifier of the uplink tunnel and the UE IP address may be corresponding to each other and replaced with each other.

At S140, the UE IP address is sent to a target base station, herein the UE IP address is further sent to the UE by the target base station.

This embodiment provides the method applied to the control plane network element shown in FIG. 2. In this embodiment, the switch request message may be a message, received from the base station, for requesting gateway switching by the UE.

At S120, the control plane network element may determine whether the user equipment UE needs to perform gateway switching. At S130, when gateway switching needs to be performed, the control plane network element assigns an IP address to the UE, herein the IP address assigned to the UE is the UE IP address in this embodiment. For example, during IP address assignment, an idle IP address is selected from an IP address pool corresponding to the target distributed gateway, as an IP address used for commutation to be performed after the UE performs gateway switching.

After completing IP address assignment, the control plane network element sends the IP address to the target distributed gateway, so that the distributed gateway itself does not need to assign an IP address of the UE. In this case, a large quantity of exchanged signaling, exchanges, and the like caused because a UE IP address assigned by the target distributed gateway is sent to both the control plane network element and the target base station is reduced.

After receiving the UE IP address, the target distributed gateway establishes the uplink tunnel, and correspondingly stores the uplink tunnel established for the UE and the UE IP address, for subsequent communication with the UE. After receiving the UE IP address of the UE, the target base station sends the UE IP address to the UE, and establishes a wireless connection with the UE to facilitate communication between the UE and the target distributed gateway. In addition, the target base station further establishes a downlink tunnel, and correspondingly stores the downlink tunnel, the UE IP address of the UE, and a user plane IP address of the target distributed gateway. In this embodiment, the user plane IP address is an IP address used for transmission of user plane data.

In a specific implementation process, the identifier of the uplink tunnel may be assigned by the control plane network element or may be distributed by the target distributed gateway. For example, the method further includes assigning uplink tunnel information, where the uplink tunnel information includes at least an uplink tunnel identifier; and sending the uplink tunnel information to the target distributed gateway, where the uplink tunnel identifier is a communication identifier of the uplink tunnel established by the target distributed gateway. For another example, the method further includes receiving the uplink tunnel identifier returned by the target distributed gateway. If the control plane network element assigns the uplink tunnel identifier, the UE IP address and the uplink tunnel identifier may be carried in same information, where the information may be in a connection request message used to trigger the target distributed gateway to establish a communication tunnel between the UE and the target distributed gateway, so that a quantity of times of returning a message to the control plane network element by the target distributed gateway and the amount of data can be reduced.

The method further includes assigning a user plane IP address to the target distributed gateway, where the uplink tunnel information further includes the user plane IP address. Certainly, in a specific implementation process, the user plane IP address of the distributed gateway may alternatively be assigned by the distributed gateway itself. In this embodiment, for assignment of all IP addresses, an IP address that is not used currently is selected from a corresponding preset IP address pool as a UE IP address or a user plane.

When the user plane IP address is assigned by the control plane network element, if the distributed gateway itself can update the user plane IP address in a specific condition, the method further includes receiving an updated user plane IP address returned by the target distributed gateway. The control plane network element receives the updated user plane IP address, and sends the updated user plane IP address to the target base station when sending downlink tunnel information to the target base station.

Optionally, the method further includes:

sending the downlink tunnel information to the target base station, where the downlink tunnel information includes at least the user plane IP address of the target distributed gateway and the uplink tunnel identifier. The user plane IP address and the uplink tunnel identifier are used by the target base station to establish a correspondence between the user plane IP address, the uplink tunnel identifier, and a downlink tunnel identifier. In this embodiment, the downlink tunnel is established by the target base station. After receiving the downlink tunnel information, the target base station establishes at least the correspondence between the user plane IP address, the uplink tunnel identifier, and the downlink tunnel identifier. In this way, when the UE performs communication with the distributed gateway subsequently, it is convenient for determining the distributed base station that performs communication with the UE and a communication tunnel used for communication with the UE. In this embodiment, the communication tunnel may include an uplink tunnel and a downlink tunnel.

Optionally, the method further includes:

assigning the downlink tunnel identifier, where the downlink tunnel information further includes the downlink tunnel identifier, and the downlink tunnel identifier is a communication identifier of the downlink tunnel established by the target base station. In this embodiment, the downlink tunnel identifier may alternatively be determined by the control plane network element, so that the target base station does not need to assign the downlink tunnel identifier any longer.

Certainly, the downlink tunnel identifier may alternatively be assigned by the target base station itself. In this case, the method further includes receiving the downlink tunnel identifier returned by the target base station.

In conclusion, regardless of how the control plane network element obtains the downlink tunnel identifier, both the downlink tunnel identifier and an IP address of the target base station need to be sent to the target distributed gateway. Therefore, in this embodiment, the method further includes sending the downlink tunnel identifier and the IP address of the target base station to the target distributed gateway.

After receiving the downlink tunnel identifier and the IP address of the target base station, the target distributed gateway may send a connection modify response message to the control plane network element. After the control plane network element receives the connection modify response message, it can be considered that the control plane network element has established a new connection for the UE, and the control plane network element may send a connection release message to a source base station to release an old connection between the UE and the source base station.

In conclusion, according to the gateway switching method provided in this embodiment, during gateway switching by the UE, a quantity of information exchanges between network elements and an amount of exchanged data.

Embodiment 3

Figure 4:
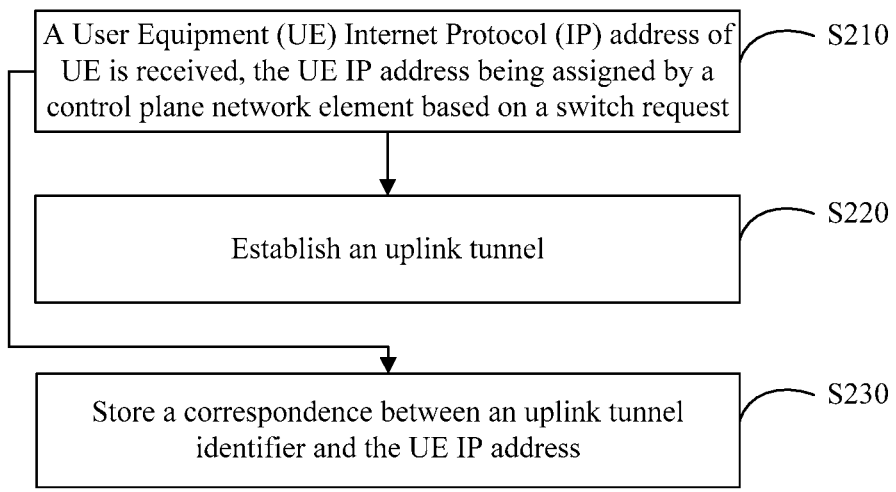
FIG. 4 is a schematic flowchart of a second gateway switching method according to an embodiment of the disclosure.

As shown in FIG. 4, this embodiment provides a gateway switching method in which an execution body is a distributed gateway, including the following operations.

At S210, a User Equipment (UE) Internet Protocol (IP) address is received, the UE IP address being assigned by a control plane network element based on a switch request.

At S220, an uplink tunnel is established.

At S230, a correspondence between an uplink tunnel identifier and the UE IP address is stored, herein the uplink tunnel identifier is a communication identifier of the uplink tunnel.

The gateway switching method provided in this embodiment may be applied to a method in a target distributed gateway. At S210, the target distributed gateway directly receives the UE IP address from the control plane network element, so that the target distributed gateway itself does not need to assign a UE IP address for the UE, reducing a quantity of information exchanges and an amount of information exchange that are required when the UE IP address is notified to the control plane network element and then forwarded to a target base station by the control plane network element.

The distributed gateway establishes an uplink tunnel. A communication identifier of the uplink tunnel is referred to as an uplink tunnel identifier. In this embodiment, the target distributed gateway establishes the correspondence between the uplink tunnel identifier and the UE IP address. In this way, when data communication with the UE is performed subsequently, it is convenient for performing data transmission by using the uplink tunnel corresponding to the uplink tunnel identifier. The establishing an uplink tunnel at S220 includes determining a user plane IP address of the target distributed gateway and the uplink tunnel identifier, and providing, through information exchange, a notification of the uplink tunnel identifier and the user plane IP address between the target base station and the target distributed gateway.

Certainly, during specific implementation, there are at least two manners of determining the uplink tunnel identifier by the target distributed gateway:

In a first manner, the method further includes receiving the uplink tunnel identifier sent from the control plane network element. In this manner, after being assigned by the control plane network element, the uplink tunnel identifier may be sent to the target distributed gateway together with the uplink tunnel information such as the UE IP address.

In a second manner, the method further includes assigning, by the target distributed gateway, the identifier to the uplink tunnel. In this manner, the uplink tunnel identifier is assigned by the target distributed gateway itself.

The user plane IP address used for communication between the target distributed gateway and the UE, may be assigned by the target distributed gateway itself, or may be received from the control plane network element.

In this way, there are two manners of obtaining the user plane IP address by the target distributed gateway.

Manner 1

The method further includes:
receiving the user plane IP address assigned by the control plane network element.

In a further improvement of this manner, the method further includes updating the user plane IP address when the user plane IP address is received from the control plane network element, and sending updated information of the user plane IP address to the control plane network element.

Manner 2

The user plane IP address is assigned. In this manner, the target distributed gateway itself distributes the user plane IP address, and finally send the user plane IP address to the control plane network element.

In conclusion, according to the gateway switching method in this embodiment, at least the UE IP address does not need to be assigned by the target distributed gateway itself. This can reduce a quantity of signaling exchanges and a data amount of signaling exchange, and can avoid a problem resulting from signaling exchange.

Embodiment 4

Figure 5:
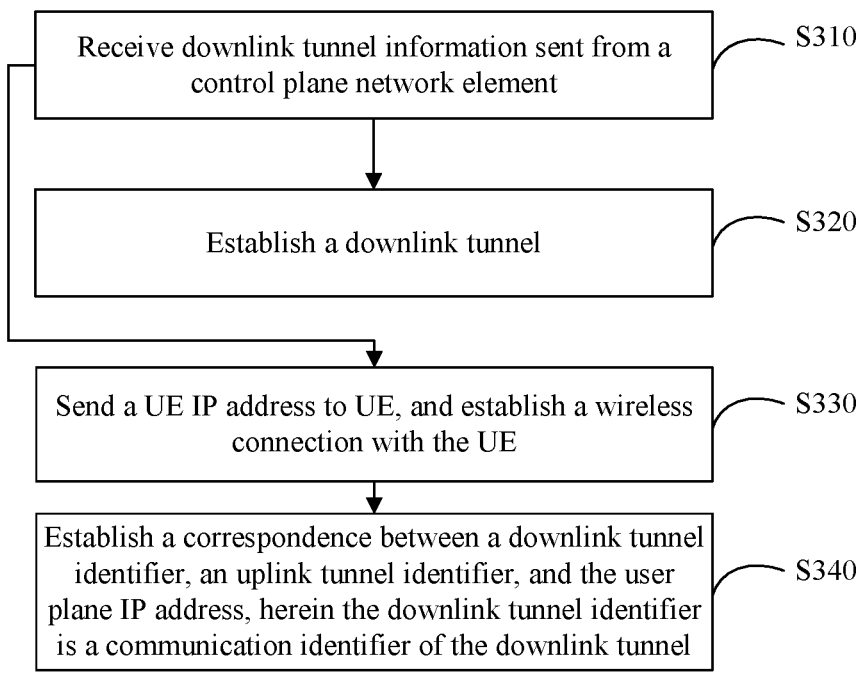
FIG. 5 is a schematic flowchart of a third gateway switching method according to an embodiment of the disclosure.

As shown in FIG. 5, this embodiment provides a gateway switching method in which an execution body is a base station, including the following operations.

At S310, downlink tunnel information sent from a control plane network element is received, herein the downlink tunnel information includes at least a UE Internet Protocol IP address of user equipment UE, an uplink tunnel identifier, and a user plane IP address of a target distributed gateway that are assigned by the control plane network element.

At S320, a downlink tunnel is established.

At S330, the UE IP address to is sent the UE, and establish a wireless connection with the UE.

At S340, a correspondence between a downlink tunnel identifier, the uplink tunnel identifier, and the user plane IP address is established, herein the downlink tunnel identifier is a communication identifier of the downlink tunnel.

The gateway switching method provided in this embodiment is a gateway switching method applied in a target base station. In this embodiment, the UE IP address received by the target base station is assigned by the control plane network element. The target base station establishes the downlink tunnel, and after receiving the UE IP address, the target base station sends the UE IP address to corresponding UE and establishes a wireless connection with the UE, to facilitate performing communication subsequently by the UE by using the wireless connection. In addition, to facilitate the use of the downlink tunnel corresponding to the downlink tunnel identifier and an uplink tunnel corresponding to the uplink tunnel identifier, downlink data transmission and uplink data transmission of the UE are performed.

The establishing a downlink tunnel at S320 includes determining the downlink tunnel identifier, and providing, through information exchange, a notification of the downlink tunnel identifier between the target base station and the target distributed gateway.

There are a plurality of manners of determining the downlink tunnel identifier. In this embodiment, the following two optional manners are provided:

In a first optional manner, the method further includes receiving the downlink tunnel identifier assigned by the control plane network element. In this manner, the downlink tunnel identifier is assigned by the control plane network element.

In a second optional manner, the method further includes assigning, by the target base station, the downlink tunnel identifier. In this manner, the downlink tunnel identifier is assigned by the target base station itself.

In conclusion, the gateway switching method in this embodiment features less signaling exchange and low establishment delay.

Embodiment 5

Figure 6:
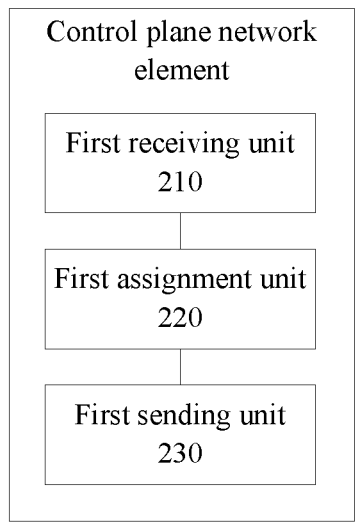
FIG. 6 is a schematic structural diagram of a control plane network element according to an embodiment of the disclosure.

As shown in FIG. 6, this embodiment provides a control plane network element, where the control plane network element includes:

a first receiving unit 210 arranged to receive a switch request message;

a first assignment unit 220 arranged to, when it is determined based on the switch request message that UE needs to perform gateway switching, assign, to the UE, a UE Internet Protocol IP address corresponding to a target distributed gateway; and a first sending unit 230 arranged to send the UE IP address to the target distributed gateway.

The first sending unit 230 is further arranged to send the UE IP address to a target base station, where the UE IP address is further sent to the UE by the target base station.

The control plane network element in this embodiment may be a control plane network element in the network architecture shown in FIG. 2, and is a functional entity located on a network side. The first receiving unit 210 and the first sending unit 230 may be corresponding to a communications interface of the control plane network element. The communications interface herein may be a wireless interface or a wired interface. The wired interface may be a cable interface or an optical cable interface.

The first assignment unit 220 may be corresponding to a processor or a processing circuit inside the control plane network element. The processor may include a processing structure such as a central processing unit, a microprocessor, a digital signal processor, an application processor, or a programmable array. The processing circuit may include an application-specific integrated circuit. The processor or the processing circuit may determine, by executing a predetermined instruction, whether the UE performs gateway switching and assigns the UE IP address.

In some embodiments, the first assignment unit 220 is further arranged to assign uplink tunnel information, where the uplink tunnel information includes at least an uplink tunnel identifier; and the first sending unit 230 is further arranged to send the uplink tunnel information to the target distributed gateway, where the uplink tunnel identifier is a communication identifier of an uplink tunnel established by the target distributed gateway. In this case, the control plane network element not only can assign the UE IP address, but also can assign the uplink tunnel identifier. Certainly, during specific implementation, the uplink tunnel identifier may be assigned by the target distributed gateway. In this case, the first receiving unit 210 is further arranged to receive the uplink tunnel identifier returned by the target distributed gateway.

In other embodiments, the first assignment unit 220 is further arranged to assign a user plane IP address to the target distributed gateway, where the uplink tunnel information further includes the user plane IP address. In this embodiment, the user plane IP address may be assigned by the first assignment unit 220 of the control plane network element. Certainly, the user plane IP address obtained by the control plane network element may alternatively be an updated user plane IP address returned by the target distributed gateway and received by the first receiving unit 210.

In some embodiments, the first sending unit 230 is arranged to send downlink tunnel information to the target base station, where the downlink tunnel information includes at least the user plane IP address of the target distributed gateway and the uplink tunnel identifier. The user plane IP address and the uplink tunnel identifier are used by the target base station to establish a downlink tunnel.

The downlink tunnel identifier may be assigned by the control plane network element or may be received by the control plane network element from the target base station. For example, the first assignment unit 220 is arranged to assign a downlink tunnel identifier, where the downlink tunnel information further includes the downlink tunnel identifier, and the downlink tunnel identifier is a communication identifier of the downlink tunnel established by the target base station. For another example, the first receiving unit 210 is arranged to receive the downlink tunnel identifier returned by the target base station.

The first sending unit 230 is arranged to send the downlink tunnel identifier and an IP address of the target base station to the target distributed gateway. In this embodiment, the downlink tunnel identifier and an IP address of the target base station are sent to the target distributed gateway by using the first sending unit 230.

The control plane network element provided in this embodiment provides implementation hardware for implementing the gateway switching method in Embodiment 2, and also can achieve less signaling exchange and low delay.

Embodiment 6

Figure 7:
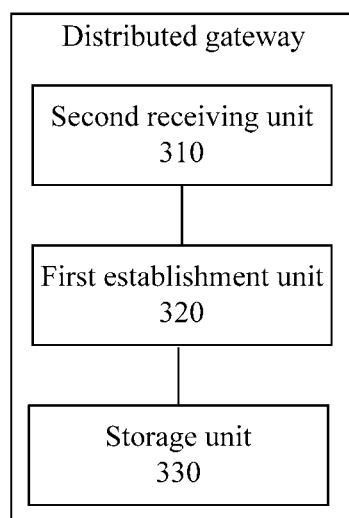
FIG. 7 is a schematic structural diagram of a distributed gateway according to an embodiment of the disclosure.

As shown in FIG. 7, this embodiment provides a distributed gateway, including:

a second receiving unit 310 arranged to receive a User Equipment (UE) Internet Protocol (IP) address, which is assigned by a control plane network element based on a switch request;

a first establishment unit 320 arranged to establish an uplink tunnel; and a storage unit 330 arranged to store a correspondence between an uplink tunnel identifier and the UE IP address, where the uplink tunnel identifier is a communication identifier of the uplink tunnel.

The distributed gateway provided in this embodiment can be arranged to implement the gateway switching method in Embodiment 3.

The second receiving unit 310 may be corresponding to various receiving interfaces, for example, a wired interface or a wireless interface.

The first establishment unit 320 may be corresponding to a processor or a processing circuit. For a specific description of the processor or the processing circuit, refer to a corresponding position of the foregoing embodiment, and details are not repeated herein.

In this embodiment, the storage unit 330 may be corresponding to various storage media, where the storage media may be various storage media, such as a RAM, a ROM, or a flash.

In some embodiments, the gateway further includes:

the second receiving unit 310 arranged to receive an uplink tunnel identifier sent from the control plane network element.

In some other embodiments, the gateway further includes a second assignment unit that is arranged to assign an identifier for the uplink tunnel. The second assignment unit herein may have a structure similar to that of the foregoing first assignment unit, but is not limited to the foregoing processor or processing circuit.

In some embodiments, the gateway further includes:

a second receiving unit 310 arranged to receive a user plane IP address assigned by the control plane network element.

In some embodiments, the gateway further includes a second assignment unit that is arranged to assign the user plane IP address.

In addition, the gateway further includes an updating unit that is arranged to update the user plane IP address when the user plane IP address is received from the control plane network element. The updating unit may also be corresponding to a processor or a processing circuit. The second sending unit may also be corresponding to a processor or a processing circuit.

In conclusion, the distributed gateway provided in this embodiment may be used to provide implementation hardware for the gateway switching method provided in Embodiment 3, and also achieves less signaling exchange and low delay.

Embodiment 7

Figure 8:
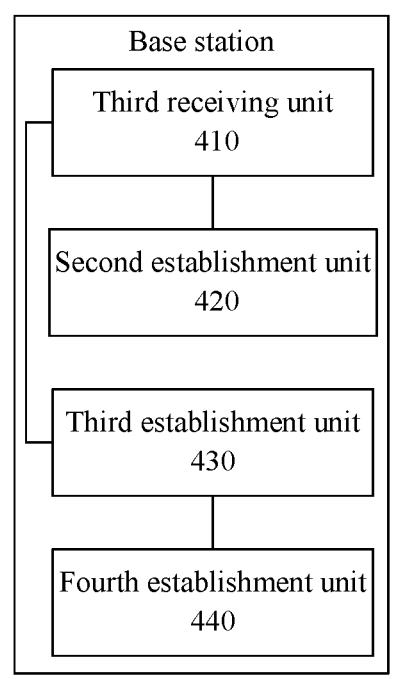
FIG. 8 is a schematic structural diagram of a base station according to an embodiment of the disclosure.

As shown in FIG. 8, this embodiment provides a base station, including:

a third receiving unit 410 arranged to receive downlink tunnel information sent from a control plane network element, where the downlink tunnel information includes at least a UE Internet Protocol IP address of user equipment UE, an uplink tunnel identifier, and a user plane IP address of a target distributed gateway that are assigned by the control plane network element;

a second establishment unit 420 arranged to establish a downlink tunnel;

a third establishment unit 430 arranged to send the UE IP address to the UE, and establish a wireless connection with the UE; and a fourth establishment unit 440 arranged to establish a correspondence between a downlink tunnel identifier, the uplink tunnel identifier, and the user plane IP address, where the downlink tunnel identifier is a communication identifier of the downlink tunnel.

The base station in this embodiment may be corresponding to the base station in FIG. 2, and may be corresponding to the target base station in Embodiment 2 to Embodiment 4.

The third receiving unit 410 may be corresponding to a communications interface that can communicate with a target distributed base station and/or the control plane network element.

The second establishment unit 420, the third establishment unit 430, and the fourth establishment unit 440 may be corresponding to a processor or a processing circuit. For details about the processor or a detailed structure of the processor, refer to a corresponding part of the foregoing embodiments, and details are not described herein again.

In some embodiments, the third receiving unit 410 is arranged to receive the downlink tunnel identifier assigned by the control plane network element.

In other embodiments, the base station further includes a third assignment unit arranged to assign the downlink tunnel identifier. The third assignment unit may be corresponding to a processor or a processing circuit. For details about the processor or a specific structure of the processor, refer to the foregoing corresponding part.

In conclusion, the base station provided in this embodiment can provide implementation hardware for the gateway switching method provided in Embodiment 4, and also achieves less signaling exchange and low delay.

This embodiment of the disclosure provides a communications device, including:

a communications interface arranged to perform information exchange with another electronic device;

a memory arranged to store a computer program; and a processor, connected to both the communications interface and the memory, and arranged to execute the computer program, so as to implement the gateway switching method according to any one or more of the foregoing technical solutions.

The communications device herein may be a control plane network element, a gateway, a base station, a terminal, or the like.

The communications interface herein may be a wired interface or a wireless interface, and may be used for information exchange between the communications device and another communications device, such as exchange of an uplink tunnel identifier and exchange of an UE IP address.

The memory may include various storage media, and may be arranged to store the computer program. The storage medium may be a read only storage medium, a random storage medium, a flash memory, or the like. In the embodiment, the memory may be a non-instant storage medium, and may be arranged to non-instantaneously store the computer program.

The processor may be an application processor (Application Processor, AP), a central processing unit (Central Processing Unit, CPU), a digital signal processor (Digital Signal Processor, DSP), a field programmable gate array (Field Programmable Gate Array, FPGA), or the like.

The processor may be connected to both the communications interface and the memory. The bus may be an integrated circuit (IIC) bus, a Peripheral Component Interconnect (PCI) bus, or the like.

In this embodiment, the communications device can perform one or more of the foregoing gateway switching methods, and can specifically perform one or more of the methods shown in FIG. 3 to FIG. 5 and FIG. 9.

An embodiment of the disclosure further provides a computer storage medium, where the computer storage medium stores a computer executable instruction, and the computer executable instruction is used to implement the gateway switching method provided in any one or more of the technical solutions.

The foregoing computer storage medium may be any medium that can store program code, such as a mobile storage device, a read-only memory (ROM), a random access memory (RAM), a magnetic disk, or an optical disc, and or may be optionally a non-instantaneous storage medium.

Several specific examples are provided with reference to any of the foregoing embodiments.

Example 1

Figure 9:
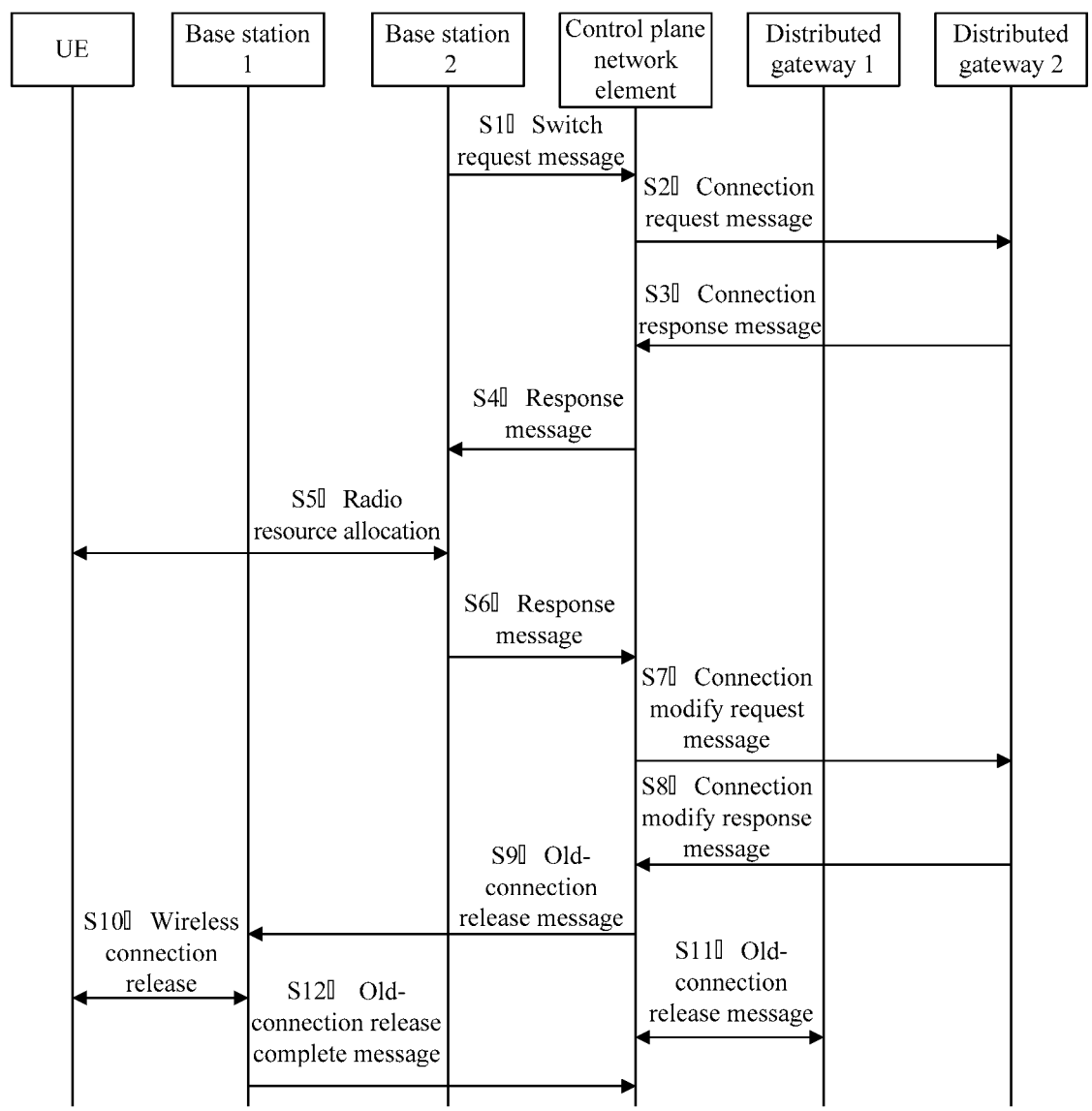
FIG. 9 is a schematic flowchart of a fourth gateway switching method according to an embodiment of the disclosure.

As shown in FIG. 9, this example provides a gateway switching method, where the method includes the following operations.

At S1, a base station 2 sends a switch request message to a control plane network element.

At S2, the control plane network element sends a connection request message to a distributed gateway 2, where the operation specifically includes: The control plane network element determines that a connection between the base station 2 and a distributed gateway 1 (a gateway in an existing connection of UE, which is referred to as a gateway 1 for short) is not optimal, the control plane selects, based on connection related information (such as Access Pointer Name, APN) carried in the switch request message, a new distributed gateway (corresponding to the target distributed gateway, which is referred to as a gateway 2 for short), and obtains a user plane IP address of the gateway 2. The control plane network element sends a connection request message to the gateway 2 based on the user plane IP address, the control plane assigns, to the UE, a UE IP address (such as an IP address pool managed by the gateway 2, where an anchor point is at the gateway 2) suitable for the gateway 2, and adds a new UE IP address of the UE to the message. The gateway 2 is the target distributed gateway.

At S3, the gateway 2 sends a connection response message to the control plane network element, where content of the connection response message includes but is not limited to an uplink tunnel identifier (Tunnel Endpointer Identity, TEID) of an uplink tunnel connected to the gateway 2. In this operation, the gateway 2 may return, to the control plane network element, a user plane IP address, different from the user plane IP address of the gateway in S2, of the gateway. In this case, the control plane network element adds the updated user plane IP address, returned by the gateway, of the gateway to a subsequent message.

At S4, the control plane network element sends a response message to the base station 2, where content of the response message includes but is not limited to a new IP address of the UE, and the TEID and an IP address of the gateway 2. In this example, the base station 2 is the target base station.

At S5, the base station 2 exchanges a message with the UE and allocates a radio resource, herein the operation specifically includes: The base station 2 transmits, to the UE, the UE IP address assigned to the UE, and allocates a corresponding radio resource.

At S6, the base station 2 sends a response message to the control plane, where content of the response message includes but is not limited to a downlink tunnel identifier TEID, assigned by the base station 2, of a downlink tunnel.

At S7, the control plane network element sends a connection modify request message to the gateway 2, where content of the connection modify request message includes but is not limited to the TEID assigned by the base station 2 and an IP address of the base station.

At S8, the gateway 2 returns a connection modify response message to the control plane network element.

At S9, the control plane network element sends an old-connection release message to a base station 1, where the base station 1 herein is equivalent to a source base station in the foregoing embodiment.

At S10, the base station 1 exchanges signaling with the UE, and releases a radio resource.

At S11, the control plane network element sends an old-connection release message to the gateway 1, to release an old PDN of the gateway 1.

At S12, the base station 1 sends a connection release complete message to the control plane network element, to complete release of an old connection.

In this embodiment, S9 to S11 may be performed at the same time.

Example 2

This example provides a gateway switching method, including the following operations.

At S21, a base station 2 sends a switch request message to a control plane.

At S22, if a control plane network element determines that a connection between the base station 2 and a gateway 1 (a gateway in an existing connection of UE) is not optimal, the control plane selects, based on connection related information (such as an APN) carried in the switch request message, a new gateway (a gateway 2), and obtains a user plane IP address of the gateway 2. The control plane network element sends a connection request message to the gateway 2 based on the user plane IP address; and the control plane assigns, to the UE, a UE IP address (such as an IP address pool managed by the gateway 2, where an anchor point is at the gateway 2) suitable for the gateway 2, and adds a new UE IP address of the UE and an uplink tunnel identifier TEID to the message. The gateway 2 is the target distributed gateway.

At S23, the gateway 2 sends a connection response message to the control plane network element.

At S24, the control plane network element sends the message to the base station 2, where content of the message includes but is not limited to a new IP address of the UE, and the TEID and an IP address of the gateway 2. In this example, the base station 2 is the target base station.

At S25, the base station 2 exchanges the message with the UE. The base station 2 transmits, to the UE, the UE IP address assigned to the UE, and allocates a corresponding radio resource.

At S26, the base station 2 sends a response message to the control plane, where content of the response message includes but is not limited to a downlink tunnel identifier TEID, assigned by the base station 2, of a downlink tunnel.

At S27, the control plane network element sends a connection modify request message to the gateway 2, where content of the connection modify request message includes but is not limited to the TEID assigned by the base station 2 and an IP address of the base station.

At S28, the gateway 2 returns a connection modify response message to the control plane network element.

At S29, the control plane network element sends a connection release message to a base station 1, where the base station 1 herein is equivalent to a source base station in the foregoing embodiment.

At S30, the base station 1 exchanges signaling with the UE, and releases a radio resource.

At S31, the control plane network element exchanges signaling with the gateway 1, and releases an old PDN.

At S32, the base station 1 sends a connection release complete message to the control plane network element, to complete release of an old connection.

Example 3

This example provides a gateway switching method, including the following operations.

At S31, a base station 2 sends a switch request message to a control plane.

At S42, if a control plane network element determines that a connection between the base station 2 and a gateway 1 (a gateway in an existing connection of UE) is not optimal, the control plane selects, based on connection related information (such as an APN) carried in the switch request message, a new gateway (a gateway 2), and obtains a user plane IP address of the gateway 2. The control plane network element sends a connection request message to the gateway 2 based on the user plane IP address; and the control plane assigns, to the UE, a UE IP address (such as an IP address pool managed by the gateway 2, where an anchor point is at the gateway 2) suitable for the gateway 2, and adds a new UE IP address of the UE and a downlink tunnel identifier TEID to the message. The gateway 2 is the target distributed gateway.

At S43, the gateway 2 sends a connection response message to the control plane network element, where content of the message includes but is not limited to a TEID of an uplink tunnel, that is, a TEID of the gateway 2.

At S44, the control plane network element sends the message to the base station 2, where content of the message includes but is not limited to a new IP address of the UE, and the TEID and an IP address of the gateway 2, and a TEID of the base station 2. In this example, the base station 2 is the target base station. The TEID of the base station 2 is a downlink tunnel identifier of the downlink tunnel.

At S45, the base station 2 exchanges the message with the UE. The base station 2 transmits, to the UE, the UE IP address assigned to the UE, and allocates a corresponding radio resource.

At S46, the base station 2 sends a response message to the control plane.

At S47, the control plane network element sends a connection modify request message to the gateway 2, where content of the connection modify request message includes but is not limited to the TEID assigned by the base station 2 and an IP address of the base station.

At S48, the gateway 2 returns a connection modify response message to the control plane network element.

At S49, the control plane network element sends a connection release message to a base station 1. The base station 1 herein is equivalent to a source base station in the foregoing embodiment.

At S50, the base station 1 exchanges signaling with the UE, and releases a radio resource.

At S51, the control plane network element exchanges signaling with the gateway 1, and releases an old PDN.

At S52, the base station 1 sends a connection release complete message to the control plane network element, to complete release of an old connection.

In several embodiments provided herein, it should be understood that the disclosed device and method may be implemented in other manners. For example, the described device embodiment is merely an example. For example, the unit division is merely logical function division and may be other division in actual implementation. For example, a plurality of units or components may be combined or integrated into another system, or some features may be ignored or not performed. In addition, the intercoupling or direct coupling or communication connection shown or discussed may be indirect coupling or communication connection through some interfaces, devices, or units; or may be implemented in electrical, mechanical, or other forms.

The units described as separate parts may or may not be physically separate. Parts displayed as units may or may not be physical units, which may be located in one position, or may be distributed on a plurality of network units. Some or all of the units may be selected according to actual needs to achieve the objectives of the solutions of the embodiments.

In addition, functional units in the embodiments of the disclosure may be integrated into one processing module, or each of the units may exist alone physically, or two or more units are integrated into one unit. The foregoing integrated unit can be implemented either in the form of hardware or in the form of software functional units.

The foregoing descriptions are merely specific implementations of the disclosure, but the protection scope of the disclosure is not limited thereto. Any modification made according to the principle of the disclosure should be understood as falling within the protection scope of the disclosure.

INDUSTRIAL APPLICABILITY

According to the technical solutions provided in the embodiments, during simple control of gateway switching by updating a computer program in a communications device, the control plane network element assigns the IP address of the UE, so as to solve an information exchange problem that the distributed gateway needs to frequently provide a notification when the distributed gateway assigns the IP address by itself. The technical solutions can be simply implemented, and can be easily applied in a communications system for reducing the amount of exchanged signaling and solving the problem of time delay resulting from link re-establishment.

The invention claimed is:

1. A gateway switching method, comprising:
receiving, by a control plane network element, a switch request message;
when determining based on the switch request message that User Equipment (UE) needs to perform gateway switching, assigning, by the control plane network element to the UE, a UE Internet Protocol (IP) address corresponding to a target distributed gateway;
sending, by the control plane network element, the UE IP address to the target distributed gateway; and
sending, by the control plane network element, downlink tunnel information to a target base station, wherein the downlink tunnel information comprises at least the UE IP address, a user plane IP address of the target distributed gateway and an uplink tunnel identifier, wherein the UE IP address is sent to the UE by the target base station, and the user plane IP address and the uplink tunnel identifier are used by the target base station to establish a correspondence between the user plane IP address, the uplink tunnel identifier, and a downlink tunnel identifier.

2. The method of claim 1, further comprising:
assigning, by the control plane network element, uplink tunnel information, wherein the uplink tunnel information comprises at least the uplink tunnel identifier; and
sending, by the control plane network element, the uplink tunnel information to the target distributed gateway, wherein the uplink tunnel identifier is a communication identifier of an uplink tunnel established by the target distributed gateway.

3. The method of claim 2, further comprising:
assigning, by the control plane network element, the user plane IP address to the target distributed gateway, wherein the uplink tunnel information further comprises the user plane IP address.

4. The method of claim 3, further comprising:
receiving, by the control plane network element, an updated user plane IP address returned by the target distributed gateway.

5. The method of claim 1, further comprising:
receiving, by the control plane network element, the uplink tunnel identifier returned by the target distributed gateway.

6. The method of claim 1, further comprising:
assigning, by the control plane network element, the downlink tunnel identifier, wherein the downlink tunnel information further comprises the downlink tunnel identifier, and the downlink tunnel identifier is a communication identifier of a downlink tunnel established by the target base station.

7. The method according to claim 6, further comprising:
sending, by the control plane network element, the downlink tunnel identifier and an IP address of the target base station to the target distributed gateway.

8. The method of claim 1, further comprising:
receiving, by the control plane network element, the downlink tunnel identifier returned by the target base station.

9. The method according to claim 8, further comprising:
sending, by the control plane network element, the downlink tunnel identifier and an IP address of the target base station to the target distributed gateway.

10. The method of claim 1, further comprising:
sending, by the control plane network element, the downlink tunnel identifier and an IP address of the target base station to the target distributed gateway.

11. A gateway switching method, comprising:
receiving, by a target distributed gateway, a User Equipment (UE) Internet Protocol (IP) address of UE, which is assigned by a control plane network element based on a switch request;
receiving, by the target distributed gateway, a user plane IP address assigned by the control plane network element, and establishing, by the target distributed gateway, an uplink tunnel; and
establishing and storing, by the target distributed gateway, a correspondence between an uplink tunnel identifier and the UE IP address, wherein the uplink tunnel identifier is a communication identifier of the uplink tunnel;
wherein the method further comprises:
sending, by the control plane network element, downlink tunnel information to a target base station, wherein the downlink tunnel information comprises at least the UE IP address, the user plane IP address of the target distributed gateway and the uplink tunnel identifier, wherein the UE IP address is sent to the UE by the target base station, and the user plane IP address and the uplink tunnel identifier are used by the target base station to establish a correspondence between the user plane IP address, the uplink tunnel identifier, and a downlink tunnel identifier.

12. The method of claim 11, further comprising:
receiving, by the distributed gateway, the uplink tunnel identifier sent from the control plane network element; or
assigning, by the distributed gateway, the uplink tunnel identifier to the uplink tunnel.

13. The method of claim 12, further comprising:
updating, by the distributed gateway, the user plane IP address when receiving the user plane IP address from the control plane network element; and
sending, by the distributed gateway, updated information of the user plane IP address to the control plane network element.

14. A gateway switching method, comprising:
receiving, by a target base station, downlink tunnel information sent from a control plane network element, wherein the downlink tunnel information comprises at least a User Equipment (UE) Internet Protocol (IP) address of UE which corresponds to a target distributed gateway and is assigned by the control plane network element when determining based on a switch request message that the UE needs to perform gateway switching, an uplink tunnel identifier, and a user plane IP address of the target distributed gateway;
establishing, by the target base station, a downlink tunnel;
sending, by the target base station, the UE IP address to the UE, and establishing a wireless connection with the UE; and
establishing, by the target base station, a correspondence between a downlink tunnel identifier, the uplink tunnel identifier, and the user plane IP address by using the user plane IP address and the uplink tunnel identifier, wherein the downlink tunnel identifier is a communication identifier of the downlink tunnel.

15. The method of claim 14, further comprising:
receiving, by the base station, the downlink tunnel identifier assigned by the control plane network element; or
self-assigning, by the base station, the downlink tunnel.

* * * * *